(12) United States Patent
Brunel

(10) Patent No.: US 7,130,353 B2
(45) Date of Patent: Oct. 31, 2006

(54) MULTIUSER DETECTION METHOD AND DEVICE

(75) Inventor: Loic Brunel, Rennes (FR)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 717 days.

(21) Appl. No.: 10/011,757

(22) Filed: Dec. 11, 2001

(65) Prior Publication Data

US 2002/0097784 A1 Jul. 25, 2002

(30) Foreign Application Priority Data

Dec. 13, 2000 (FR) ................................. 00 16351

(51) Int. Cl.
*H04L 23/02* (2006.01)
*H04L 5/12* (2006.01)
*H04L 27/28* (2006.01)
*H04K 1/10* (2006.01)

(52) U.S. Cl. ................... 375/261; 375/147; 375/260
(58) Field of Classification Search ............... 375/147, 375/130, 136, 148, 149, 150, 316, 260, 261, 375/324, 340, 341; 370/203, 204, 206–208, 370/210, 335, 342, 441
See application file for complete search history.

(56) References Cited

U.S. PATENT DOCUMENTS

| | | | | |
|---|---|---|---|---|
| 5,297,170 A * | 3/1994 | Eyuboglu et al. | ............ | 375/242 |
| 5,504,775 A * | 4/1996 | Chouly et al. | ............. | 370/210 |
| 5,831,984 A | 11/1998 | Hottinen | | |
| 6,181,729 B1 * | 1/2001 | O'Farrell | .................. | 375/130 |
| 6,263,013 B1 * | 7/2001 | Hendrickson | ............... | 375/150 |
| 6,377,631 B1 * | 4/2002 | Raleigh | ..................... | 375/299 |
| 6,618,433 B1 * | 9/2003 | Yellin | ......................... | 375/148 |
| 6,654,365 B1 * | 11/2003 | Sylvester et al. | ........... | 370/342 |
| 6,801,579 B1 * | 10/2004 | Hassibi et al. | .............. | 375/264 |
| 2001/0017881 A1 | 8/2001 | Bhatoolaul et al. | | |
| 2001/0050948 A1 | 12/2001 | Ramberg et al. | | |
| 2002/0072336 A1 | 6/2002 | Mottier | | |
| 2003/0012269 A1 | 1/2003 | Kanemoto et al. | | |

FOREIGN PATENT DOCUMENTS

EP 0 465 851 1/1992

OTHER PUBLICATIONS

[2000 IEEE 0-7803-5857-0/00] O. Damen et al., Sphere Decoding of Space-Time Codes, Jun. 25-30, 2000, ISIT 2000, Sorrento, Italy, p. 362.*
[1988 IEEE 0018-9448/88/0900-1188] J-P Adoul et al., Near Neighbor Algorithm for Spherical Code from the Leech Lattice, IEEE Trans. on Infor. Theory, vol. 34, No. 5, Sep. 1988, pp. 1188-1202.*

(Continued)

*Primary Examiner*—Betsy L. Deppe
(74) *Attorney, Agent, or Firm*—Oblon, Spivak, McClelland, Maier & Neustadt, P.C.

(57) ABSTRACT

Method of detecting a plurality of symbols ($d_k(i)$) transmitted by or for a plurality K of users, each symbol belonging to a modulation constellation and being the subject of a spectral spreading before being modulated on a plurality L of carriers, the method comprising a step of demodulation (420) and a step of spectral despreading (430) of the received signal (r(i)) in order to supply a vector ($y_2(i), \tilde{y}_2(i)$) characteristic of the signal, and a step (450) of searching, within an array of points ($\Lambda_2, \Omega_2$) generated by the symbols of the modulation constellations, for at least the closest neighbour of the vector.

12 Claims, 4 Drawing Sheets

OTHER PUBLICATIONS

[1996 IEEE 0-7803-3567-8/96] M. Schnell et al., Diversity Considerations for MC-CDMA Sysems in Mobile Communications, Proc. of IEEE 4th Int. Symp. on Spread Spectrum Techniques and Applications, vol. 1, Sep. 22-25, 1996, pp. 131-135.*

[1999 IEEE 0-7803-5268-8/99] Brunel et al., EuclideanSpace Lattice Decoding for Joint Detection in CDMA Systems, 1999 IEEE ITW, Kruger National Park, South Africa, Jun. 20-25, 1999, p. 129.*

Verdu, Minimum Probability of Error for Asynchronous Gaussian Multiple-Access Channels, IEEE Transactions on Information Theory, vol. IT-32, No. 1, Jan. 1986.*

S. Nahm, et al., IEEE GLEBECOM 1996, XP-000748718, vol. 3, pp. 1583-1587, "Time-Domain Equalization for the Orthogonal Multi-Carrier CDMA System", Nov. 18, 1996.

J.-F. Helard, et al., Electronic Letters, XP-000936982, vol. 36, No. 7, pp. 665-666, "Linear MMSE Detection Technique for MC-CDMA", Mar. 30, 2000 (p. 666 will be filed later).

P. Jung, et al., Frequenz, XP-000765910, vol. 51, No. 11/12, pp. 270-275, "A Generalized View on Multicarrier CDMA Mobile Radio Systems With Joint Detection (Part II)", Nov. 1, 1997.

A. Klein, et al., PIMRC'92, The Third IEEE International Symposium on Personal, Indoor and Mobile Radio Communications (CAT. No. 92TH0488-7), pp. 118-122, "Simultaneous Cancellation of Cross Interference and ISI in CDMA Mobile Radio Communications", Oct. 19-21, 1992.

U.S. Appl. No. 10/012,330, filed Dec. 12, 2001, pending.
U.S. Appl. No. 10/011,757, filed Dec. 11, 2001, pending.
U.S. Appl. No. 10/014,899, filed Dec. 14, 2001, pending.
U.S. Appl. No. 10/029,953, filed Dec. 31, 2001, pending.

S. Nahm, et al., IEEE GLEBECOM 1996, XP-000748718, vol. 3, pp. 1583-1587, "Time-Domain Equalization for the Orthogonal Multi-Carrier CDMA System", Nov. 18, 1996.

J.-F. Helard, et al., Electronic Letters, XP-000936982, vol. 36, No. 7, pp. 665-666, "Linear MMSE Detection Technique for MC-CDMA", Mar. 30, 2000 (p. 666 will be filed later).

P. Jung, et al., Frequenz, XP-000765910, vol. 51, No. 11/12, pp. 270-275, "A Generalized View on Multicarrier CDMA Mobile Radio Systems With Joint Detection (Part II)", Nov. 1, 1997.

A. Klein, et al., PIMRC'92, The Third IEEE International Symposium on Personal, Indoor and Mobile Radio Communications (CAT. No. 92TH0488-7), pp. 118-122, "Simultaneous Cancellation of Cross Interference and ISI in CDMA Mobile Radio Communications", Oct. 19-21, 1992.

Shinsuke Hara et al, "Overview of Multicarrier CDMA," IEEE Communications Magazine, Dec. 1997, pp. 126-133.

Nathan Yee et al, "Multi-Carrier CDMA in Indoor Wireless Radio Networks," PIMRC'93, The Fourth International Symposium on Personal, Indoor and Mobile Radio Communications, Communications- the birge to the future, Sep. 8-11, 1993.

Stefan Kaiser et al, "Multi-Carrier CDMA with Iterative Decoding and Soft-Interference Cancellation," IEEE, Aug. 1997, pp. 6-10.

U. Fawer, et al. Proceedings of the Military Communications Conference (MILCOM), IEEE, vol. 3, pp. 977-981, XP-000506005, "Multiuser Reception for Trellis-Based Code Division Multiple Access Communications", Oct, 2-5, 1994.

[1999 IEEE 0-7803-5599-7/99] Song, et al., Subspace Blind Detection of Asynchronous CDMA Signals In Multipath Channels, pp. 21-24.

[1990 IEEE 0733-8716/90] Kohno, et al. Combination of an Adaptive Array and a Canceller of Interference for Direct-Sequence Spread-Spectrum Multiple-Access System, IEEE Journal on Selected Areas in Communications, vol. 8 No. 4, May 1990, pp. 675-682.

[1996 IEEE 0-7803-3567-8/96] Schnell, et al., Diveristy Considerations for MC-CDMA Systems in Mobile Communications, 1996 IEEE ICT, German Aerospace Research Establishment, Webling, Germany, pp. 131-135.

[1999 IEEE 0018-9448/99] Viterbo, et al., A Universal Lattice Code Decoder for Fading Channels, 1999 IEEE Transactions on Information Theory, vol. 45, No. 5, Jul. 1999, pp. 1639-1642.

[1989 IEEE 0018-9448/89/0100-0123] Lupas, et al., Linear Multiuser Detectors for Synchronous Code-Division Multiple-Access Channels, 1989 IEEE Transactions on Information Theory, vol. 35, No. 1, Jan. 1989, pp. 123-136.

* cited by examiner

MULTIUSER DETECTION METHOD AND DEVICE

BACKGROUND OF THE INVENTION

1. Field of Use

The present invention concerns a multiuser detection method and device. More particularly, the present invention concerns a maximum likelihood multiuser detection method and device for an MC-CDMA (Multi-Carrier Code Division Multiple Access) telecommunication system.

2. Discussion of the Background

Multicarrier Code Division Multiple Access (MC-CDMA) combines OFDM (Orthogonal Frequency Division Multiplex) modulation and the CDMA multiple access technique. This multiple access technique was proposed for the first time by N. Yee et al. in an article entitle "Multicarrier CDMA in indoor wireless radio arrays" which appeared in Proceedings of PIMRC '93, Vol. 1, pages 109–113, 1993. The developments of this technique were reviewed by S. Hara et al. in the article entitled "Overview of multicarrier CDMA" published in IEEE Communication Magazine, pages 126–133, Dec. 1997.

Unlike the DS-CDMA (Direct Sequence Code Division Multiple Access) method in which the signal of each user is multiplied in the time domain in order to spread its frequency spectrum, the signature here multiplies the signal in the frequency domain, each element of this signature multiplying the signal of a different sub-carrier.

More precisely, FIG. 1 depicts the structure of an MC-CDMA transmitter for a given user k. Let $d_k(i)$ be the ith symbol to be transmitted from the user k, where $d_k(i)$ belongs to the modulation alphabet. The symbol $d_k(i)$ is first of all multiplied at 110 by a spread sequence or signature of the user, denoted $c_k(t)$, consisting of $N_c$ "chips", each "chip" being of duration $T_c$, the total duration of the spread sequence corresponding to a symbol period T. The results of the multiplication of the symbol $d_k(i)$ by the different "chips" are converted by the serial to parallel converter 120 into a block of L symbols, where L is in general a multiple of $N_c$. It will be considered, for reasons of simplification of presentation, that $L=N_c$. The block of L symbols is then subject to an inverse FFT in the module 130 in order to be transmitted to the parallel to serial converter 140. In order to prevent inter-symbol interference, a guard time, with a length greater than the duration of the pulse response of the transmission channel, is added to the MC-CDMA symbol. This guard time is obtained by the addition (not shown) of a suffix chosen so as to be identical to the start of the said symbol. The symbol thus obtained is amplified at 150 before being transmitted over the channel of the user. It can therefore be seen that the MC-CDMA method can be analysed as a spread in the spectral domain (before IFFT) followed by an OFDM modulation.

In practice, the user k transmits his data in the form of frames of N symbols, each symbol $d_k(i)$ being spread by a real signature $c_k(t)$ with a duration equal to the symbol period T, such that $c_k(t)=0$ if $t \notin [0,T]$. The signal modulated at time $t=i.T+n.T_c$ can then be written, if the guard times between the MC-CDMA symbols are omitted:

$$S_k(t) = \sum_{i=0}^{N-1} \sum_{n=0}^{L-1} a_k \cdot d_k(i) \cdot c_k(n \cdot T_c) \cdot \exp(j \cdot 2\pi n/N_c) \quad (1)$$

where $a_k$ is the amplitude of the signal transmitted by the user k.

If the case is now taken of a base station transmitting symbols to K users, the resulting modulated signal can be expressed simply as:

$$S(t) = \sum_{k=1}^{K} \sum_{i=0}^{N-1} \sum_{n=0}^{N_i-1} a_k \cdot d_k(i) \cdot c_{kn} \cdot \exp(j \cdot 2\pi n/N_c) \quad (2)$$

where $c_{kn}=c_k(n.T_c)$ has been noted.

An MC-CDMA receiver for a given user k has been illustrated schematically in FIG. 2.

The demodulated received signal is sampled at the "chip" frequency and the samples belonging to the guard time are eliminated (elimination not shown). The signal obtained can be written:

$$R(t) = \sum_{k=1}^{K} \sum_{i=0}^{N-1} \sum_{n=0}^{L-1} a_k \cdot d_k(i) \cdot c_{kn} \cdot h_{kn}(i) \cdot \exp(j \cdot 2\pi n/N_c) + \eta(t) \quad (3)$$

where $h_{kn}(i)$ represents the response of the channel of the user k at the frequency of the sub-carrier n of the MC-CDMA symbol transmitted at time i.T and $\eta(t)$ is the noise received.

The samples thus obtained are put in parallel by a serial to parallel converter 210 before undergoing an FFT in the module 220. The samples in the frequency domain, output from 220, are equalised and despread by the signature of the user k. To do this, the samples of the frequency domain are multiplied by the coefficients $q_{kn}(i).c^*_{kn}$ in the multipliers 230$_0$, . . . , 230$_{N_c-1}$ and then added at 240 in order to supply an output symbol dk(i).

Different possibilities of equalisation have been envisaged in the state of the art, including notably the MRC (Maximium Ratio Combining) combination defined by the user of the coefficients $q_{kn}(i)=h^*_{kn}(i)$ or .* is the conjugation operation.

The receiver illustrated in FIG. 2 makes it possible to decode only the data of a single user k. However, it is often advantageous to decode data transmitted for all of the K users, in order to estimate and eliminate the interference between the different transmission channels. The techniques of multiuser detection and conjoint detection have also been envisaged for the MC-CDMA method. For example, the article by S. Kaiser et al. entitled "Multi-carrier CDMA with iterative decoding and soft-interference cancellation" published in GLOBECOM '97 at pages 6–10, 1997, proposes a method of conjoint detection with parallel elimination of the interference (PIC standing for Parallel Interference Cancellation). However, this detection technique does not necessarily provide the optimum solution in terms of maximum likelihood. In addition, the direct application of a maximum likelihood detection technique to a multiuser context would result in prohibitive complexity.

SUMMARY OF THE INVENTION

The aim of the present invention is to propose a multiuser detection method and device in the context of an MC-CDMA transmission which does not have the drawbacks of the above mentioned techniques.

To this end, the present invention is defined by a method of detecting a plurality of symbols ($d_k(i)$) transmitted by or for a plurality K of users, each symbol belonging to a modulation constellation and being the subject of a spectral spreading before being modulated on a plurality L of carriers, the method comprising a step of demodulation and a step of spectral despreading of the received signal ($r(i)$) in order to supply a vector ($y(i)$, ($\tilde{y}(i)$, $y2(i)$, $\tilde{y}_2(i)$)) characteristic of the signal, the method also comprising a step of searching, within the array of points ($\Lambda, \Omega, \Lambda_2, \Omega_2$) generated by the symbols of the modulation constellations, for at least the closest neighbour of the vector.

Advantageously, the search step is limited to a set of points in the array belonging to a predetermined zone around the received vector.

Alternatively, the search step is limited to a set of points in the array belonging to a predetermined zone around the origin of the array.

If the transmitted symbols have been spectrally spread by means of sequences with real values, the complex vector can be decomposed into a first vector with real components and a second vector with real components. The search step then consists of determining the closest neighbour to the first vector and the second vector within an array ($7,\Sigma$) of points with real coordinates of dimension K.

In the general case, the complex vector being considered to be a vector with real components of size 2.K, the search step consists of determining the closest neighbour within an array ($7_2,\Sigma_2$) of points with real coordinates of dimension 2.K. The search step is advantageously effected on a plurality of real components of the complex vector, the search being limited for each of the components to an interval defined by a lower delimiter and an upper delimiter, the delimiters being chosen so that the interval does not comprise points relating to symbols which cannot belong to the modulation constellation.

According to one embodiment of the invention, the spectral demodulation step is followed by a step of despreading and equalisation of the symbols obtained by demodulation of the signal received at the different carriers, providing a vector (($\tilde{y}(i)$, $\tilde{y}_2(i)$)) of symbols equalised for the different users.

Advantageously, the characteristic vector (($\tilde{y}(i)$, $\tilde{y}_2(i)$)) is obtained from the vector of equalised symbols by means of a matrix processing aimed at substantially decorrelating the different noise components thereof According to a variant, the search step is extended to that of a set of points adjacent to the characteristic vector and the transmitted symbols are estimated in a flexible manner from symbols generating the adjacent points and distances separating the adjacent points to the received point.

The invention is also defined by a device for detecting a plurality of symbols ($d_k(i)$) transmitted by or for a plurality K of users, each symbol belonging to a modulation constellation and being the subject of a spectral spreading before being modulated on a plurality L of carriers, the device comprising means for implementing the method disclosed above.

Such a detection device can be used in an MC-CDMA mobile telecommunication system.

BRIEF DESCRIPTION OF THE DRAWINGS

The characteristics of the invention mentioned above, as well as others, will emerge more clearly from a reading of the following description given in relation to the accompanying figures, amongst which.

DETAILED DESCRIPTION OF THE INVENTION

Figure 1:
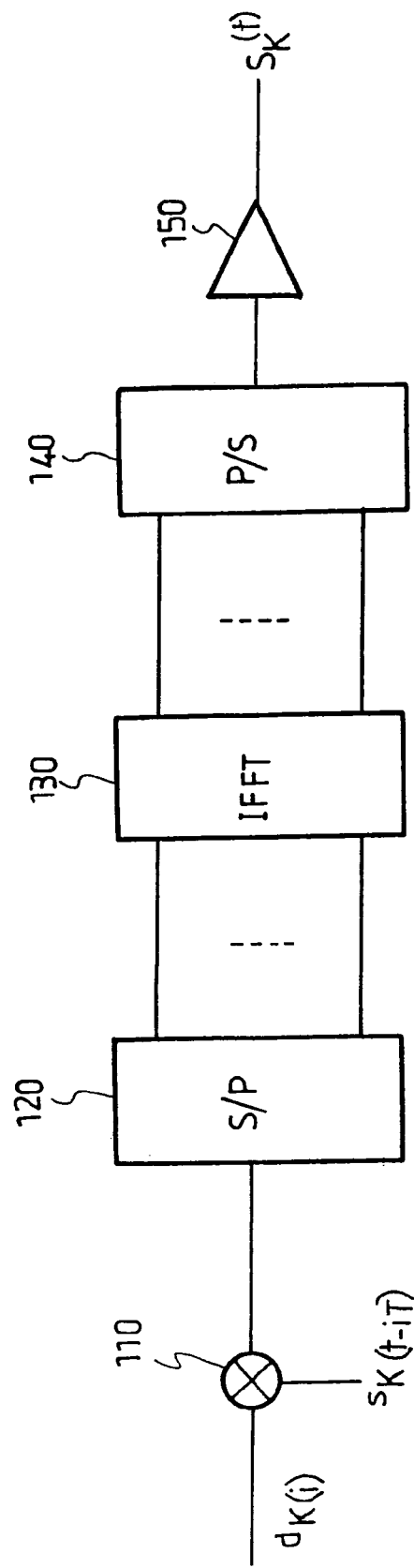
FIG. 1 depicts schematically the structure of a known MC-CDMA transmitter of the state of the art.
Figure 2:
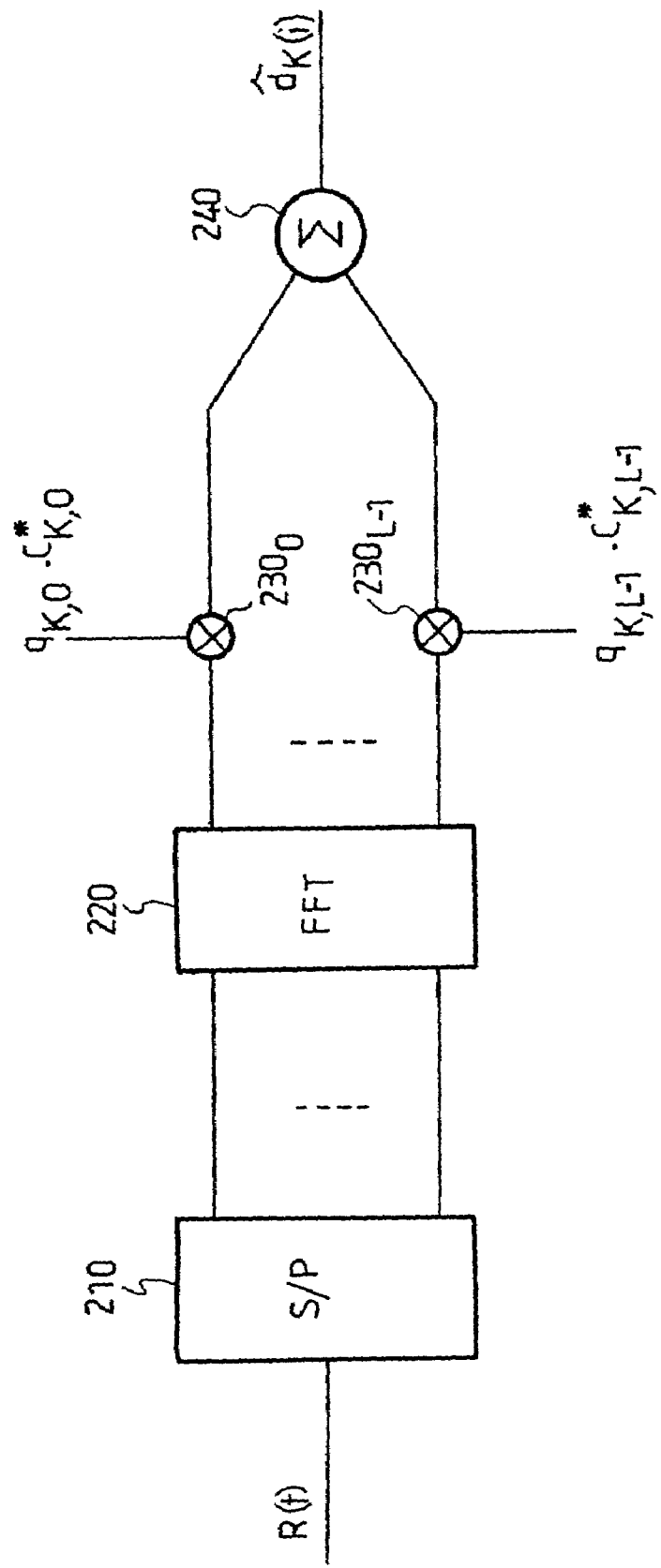
FIG. 2 depicts schematically the structure of a single-user MC-CDMA receiver.

The idea at the basis of the invention is to effect an MC-CDMA multiuser detection by a representation by means of an array of points.

Consider once again an MC-CDMA telecommunication system and consider also a signal received at time i on the L different sub-carriers of the OFDM signal. It will be assumed once again that the number of sub-carriers is equal to the spread factor. Let $r(i)=(r_1(i), \ldots, r_L(i))$ be the vector of the signals received on the different sub-carriers and $d(i)=(d_1(i), \ldots, d_K(i))$ be the vector of the K symbols transmitted at time i. C, the matrix of the K spread sequences of length L, can be written:

$$C = \begin{bmatrix} C11 & \cdots & C1L \\ \vdots & & \vdots \\ CK1 & \cdots & CKL \end{bmatrix}$$

If the case is taken of the downlink, a single transmission channel is to be taken into account. It will be assumed that the channel is non-selective with respect to frequency on each sub-carrier l and is disturbed by a white additive Gaussian noise. The transfer function of the channel at time i can be represented by L complex coefficients $h_l(i)$, $l=1, \ldots, L$. These coefficients are grouped together in the diagonal matrix $H=\text{Diag}(h_1(i), \ldots, h_L(i))$. Equation (3) giving the received signal is expressed in matrix form:

$$r(i)=d(i)AC(i)H(i)+\eta(i) \tag{4}$$

where $\eta(i)=(\eta_1(i), \ldots, \eta_L(i))$ is the white additive Gaussian noise vector and A the diagonal matrix $\text{Diag}(a_1, \ldots, a_K)$ formed by the amplitudes for the different users.

In the uplink, the signal coming from each user passes through a different channel. It will be assumed as above that the channels are non-selective with respect to frequency on each sub-carrier l. The spread and the channel effect can then be combined in a matrix $C_U(i)$:

$$C_U(i) = \begin{bmatrix} c_{11}h_{11}(i) & \cdots & c_{1L}h_{1L}(i) \\ \vdots & & \vdots \\ c_{K1}h_{K1}(i) & \cdots & c_{KL}h_{KL}(i) \end{bmatrix}$$

Should all the users be received synchronously, the received signal can then be written:

$$r(i)=d(i)AC_U(i)+\eta(i) \tag{5}$$

The symbol transmitted is sought in the sense of the maximum likelihood, that is to say the vector $d(i)$ of the K symbols transmitted such that the mean square deviation:

$$D^2(d)=\|r(i)-d(i)AC_U(i)\|^2 \tag{6}$$

is at a minimum.

In an equivalent manner the expression:

$$D_R^2(d) = \|d(i)AC_U(i)\|^2 - 2Re\langle d(i)AC_U(i); r(i)\rangle \quad (7)$$

can be minimised, and the scalar product can also be written:

$$\langle d(i)ACu(i); r(i)\rangle = \sum_{l=1}^{K}\sum_{k=1}^{K} a_k d_k *(i)c_{kl}*(i)h_{kl}*(i)r_l(i) = \quad (8)$$

$$\sum_{k=1}^{K} a_k d_k *(i) \sum_{l=1}^{L} c_{kl}*(i)h_{kl}*(i)r_l(i) = \sum_{k=1}^{K} a_k d_k *(i) y_k(i)$$

where:

$$y_k(i) \stackrel{\Delta}{=} \sum_{l=1}^{L} c_{kl}*(i)h_{kl}*(i)r_l(i)$$

has been defined.

The knowledge of the observation vector $y(i)=(y_1(i), \ldots, y_K(i))$ is sufficient to allow the detection in the sense of the maximum likelihood of the transmitted vector $b(i)$. The observation $y(i)$ can be written in matrix form from equation (8)

$$y(i) = r(i)C_U^H(i) \quad (9)$$

where $\bullet^H$ designates the hermitian transpose.

For a downlink, a similar definition can be used, except that the matrix C can be factorised into a channel matrix and a spread matrix:

$$y(i)^\Delta = r(i)C_D^H(i) \text{ with } C_D(i) = C(i)H(i) \quad (10)$$

It should be noted that expression (8), or equivalently (9) or (10), is none other than a filtering operation adapted to the signature and channel relating to each user k. It can be considered to be an MRC (Maximum Ratio Combining) combination of the different symbols received.

Alternatively, whilst keeping the spectral despreading, it is possible to use an equalisation method other than MRC combination. Thus, instead of the coefficients $h_{kl}*(i)$ in equation (9), the coefficients $$q_{k,l}(i) = \frac{h_{kl}*(i)}{|h_{kl}(i)|}$$

(Equal Gain Combining) or $$q_{k,l}(i) = \frac{h_{kl}*(i)}{|h_{kl}(i)|^2}$$

(Orthogonality Restoration Combining) can be employed. However, for reasons of simplification of presentation it will be assumed hereinafter that $q_{k,l}(i) = h_{kl}*(i)$.

Replacing expression (5) in (9), the expression of the observation vector $y(i)$ is obtained as a function of the vector of the transmitted symbols $d(i)$ for the uplink:

$$y(i) = d(i)AC_U(i)C_U^H(i) + n(i) \text{ or } y(i) = d(i)M(i) + n(i) \quad (11)$$

with $M(i) = AC_U(i)C_U^H(i) \quad (12)$

Naturally, expression (11) also applies to the downlink provided that:

$$M(i) = AC_D(i)C_D^H(i) \quad (13)$$

is taken.

It will be demonstrated below that $y(i)$ as given by equation (11) can be seen as a point in an array $\Lambda_2$ of dimension 2K, with a complex generator matrix $M(i)=AC_U(i)C_U^H(i)$ corrupted by a noise $n(i)=(n_1(i), \ldots, n_K(i))$ such that:

$$n_k(i) = \sum_{l=1}^{L} c_{kl}*(i)h_{kl}*(i)\eta_l(i) \quad (14)$$

The term real array of points $\Lambda$ of dimension K will be applied to any set of vectors of $R^K$ satisfying:

$$x = b_1 v_1 + b_2 v_2 + \ldots + b_K v_K \text{ whereby } b_i \in Z, \forall i=1, \ldots, K$$

where $\{v_1, v_2, \ldots, V_K\}$ is a base on $R^K$.

The points of the array form an additive Abelian sub-group of $R^K$, which is moreover the smallest sub-group of $R^K$ containing the vectors $\{v_1, v_2, \ldots, V_K\}$ and a Z-modulus of $R^K$. These base vectors form the lines of the generator matrix G of the array. It is therefore possible to write $x=bG$ where $b=(b_1, \ldots, b_K) \in Z^K$. (15)

The region delimited by the base vectors is referred to as a fundamental parallelotope and its volume, denoted $vol(\Lambda)$ or $det(\Lambda)$, is referred to as the fundamental volume. This fundamental volume is none other than the modulus of the vector product of the K base vectors and is therefore equal to $|det(G)|$ where det designates the determinant. Though there are several possible choices for the generator matrix of the same array, there is on the other hand only one value for the fundamental volume.

The Voronoïregion V or Dirichlet cell of a point x belonging to the array is the set of points of $R^K$ closer to x than any other point in the array. The volume of this region is equal to the fundamental volume.

The stacking radius $\rho$ of the array is the radius of the largest sphere fitting in the Voronoïregion and the radius of coverage is that of the smallest sphere circumscribed in this same region. The radius of stacking is therefore the radius of the spheres whose stack constitutes the array of points and the radius of overlap is that of the smallest spheres which, centred on the points of the array, make it possible to cover the entire space $R^K$. The density of the array is the ratio between the volume of the sphere of radius $\rho$ and the fundamental volume. Finally, the coefficient of error (the kissing number) $\tau(\Lambda)$ of the array is the number of spheres tangent with the same sphere in the stack or, in other words, the number of neighbours of a point in the array, situated at the minimum distance $d_{Emin} = 2\rho$.

The term complex array of points (or array on C) of dimension K will be given to any set of vectors x such that $x = bG$ where $b = b^R + j.b^I$ with $b^R, b^I \in Z^K$ and where G is a matrix with complex coefficients of rank K As will be shown, an array of dimension K on C can be seen as a real array of dimension 2K on R.

The vectors $y(i), d(i), n(i)$ and the matrix $M(i)$ appearing in equation (11) are of the complex component type. Equation (11) can also be written in the equivalent real form:

$$y_2(i) = d_2(i)M_2(i) + n_2(i) \quad (16)$$

with:

$y_2(i)=(y_1^R(i), y_1^I(i), \ldots, y_K^R(i) y_K^I(i))$ where $y_k^R(i)$, $y_k^I(i)$ are respectively the real part and the imaginary part of the symbol $y_k(i)$;

$d_2(i)=(d_1^R(i) d_1^I(i), \ldots, d_K^R(i), d_K^I(i))$ where $d_k^R(i)$, $d_k^I(i)$ are respectively the real part and the imaginary part of the symbol $d_k(i)$;

$n_2(i)=(n_1^R(i), n_1^I(i), \ldots, n_K^R(i), n_K^I(i))$ where $n_k^R(i)$, $n_k^I(i)$ are respectively the real part and the imaginary part of $n_k(i)$;

and where $M_2$ is the matrix $2K \times 2K$ defined by:

$$M_2 = \begin{bmatrix} M_{11}^R & M_{11}^I & \cdots & M_{1K}^R & M_{1K}^I \\ -M_{11}^I & M_{11}^R & \cdots & -M_{1K}^I & M_{1K}^R \\ \vdots & \vdots & & \vdots & \vdots \\ M_{K1}^R & M_{K1}^I & \cdots & M_{KK}^R & M_{KK}^I \\ -M_{K1}^I & M_{K1}^R & \cdots & -M_{KK}^I & M_{KK}^R \end{bmatrix} \quad (17)$$

with $M_{lk}=M_{lk}^R+j.M_{lk}^I$ where the index i has been omitted in order to simplify the notations.

The components of the vector $d_2(i)$ belong to a finite alphabet of cardinal A. For example, the components $d_k^R(i)$ and $d_k^I(i)$ can be PAM modulation symbols of order M. In this case, $$d_k^R(i) \in \{-M+1, -M+3, \ldots, M-3, \ldots M-1\} \text{ and} \quad (18)$$

$$d_k^I(i) \in \{-M+1, -M+3, \ldots, M-3, M-1\} \quad (19)$$

If the transformation:
$d'_k^R(i)=\frac{1}{2}(d_k^R(i)+M-1)$ and $d'_k^I(i)=\frac{1}{2}(d_k^I(i)+M-1)$ is effected, then, vectorially:

$$d'_2(i)=\frac{1}{2}(d_2(i)+v_M) \quad (20)$$

where $v_M=(M-1, M-1, \ldots, M-1)$ the components $d'_k^R(i)$ and $d'_k^I(i)$ are elements of Z and consequently $d'_2(i)$ is a vector of $Z^{2K}$.

In general terms, the invention can be applied to any finite alphabet of symbols such that there is an affine transformation transforming the components $d_k^R(i)$ and $d_k^I(i)$ into elements of Z.

Similarly, the corresponding transformation is effected on $y_2(i)$, that is to say:

$$y'_2(i) = \frac{1}{2}(y_2(i) + v_M M_2) \quad (21)$$

By means of this transformation, which will be assumed to be implicit hereinafter, the vector $d_2(i)M_2(i)$ then belongs to an array of points $\Lambda_2$ as defined by equation (15) with $G=M_2(i)$. The vector $y_2(i)$ can therefore be considered to be a point in the array $\Lambda_2$ corrupted by a noise $n_2(i)$.

If it is assumed that the components of the noise vector $n_2(i)$ are independent random centred Gaussian variables, the problem of the detection in the sense of the maximum likelihood of the symbols transmitted by the different users can be represented as the search for the point $z_2$ in the array $\Lambda_2$ such that its distance to $y_2(i)$ is at a minimum.

In reality, the result of the expression (14) is that the noise components are correlated since, if the real vector of the received noise corresponding to the complex vector η is denoted $\eta_2$, if the matrix obtained from $C_U$ according to the transformation given at (17) is denoted $C_{U2}$, and if the autocorrelation matrix of the noise vector $n_2(i)$ is denoted $R_2$:

$$R_2=E(n_2^T n_2)=E(C_{U2}\cdot_2^T\cdot_2 C_{U2}^T)=C_{U2}E(\cdot_2^T\cdot_2)$$
$$C_{U2}^T=N_0 C_{U2}C_{U2}^T \quad (22)$$

for the uplink, $$R_2=E(n_2^T n_2)=E(C_{D2}\cdot_2^T\cdot_2 C_{D2}^T)=C_{D2}E(\cdot_2^T\cdot_2)$$
$$C_{D2}^T=N_0 C_{D2}C_{D2}^T \quad (23)$$

for the downlink.

In order to go back to the decorrelated case, an operation of whitening the noise is performed prior to the decoding.

The autocorrelation matrix $R_2$ is symmetrical defined positive and can therefore be the subject of a Cholesky factorisation:

$$R_2=W_2 W_2^T \quad (24)$$

where $W_2$ is an inferior triangular matrix of size $2K \times 2K$.

A whitened observation vector: $\tilde{y}_2(i)=y_2(i)W_2^{T-1}$ (25) is defined as well as a new array of points $\Omega_2$ consisting of the vectors of components $(\tilde{x}_1^R(i), \tilde{x}_1^I(i), \ldots, \tilde{x}_K^R(i), \tilde{x}_K^I(i))$ with $\tilde{x}_2(i)=x_2(i)W_2^{T-1}$ where $x_2(i)$ is a vector of components $(x_1^R(i), x_1^I(i), \ldots, x_K^R(i), x_K^I(i))$ belonging to $\Lambda_2$.

It can easily be shown that, after whitening, the covariance matrix of the filtered noise $n_2(i)W_2^{T-1}$ is equal to $N_0 I_{2K}$ where $I_{2K}$ is the identity matrix of dimension $2K$. The decoding then comprises a first step of whitening the observation vector followed by a step of seeking the closest neighbour in the array of points $\Omega_2$.

It is important to note that equation (23) (downlink) is simplified when spread sequences at real values are used.

This is because, in this case, equation (13) can be written:

$$M(i)=AC_D(i)C_D^H(i)=AC(i)H(i)H^H(i)C^H(i)=AC(i)|H(i)|^2 C^H(i) \quad (26)$$

where $|H(i)|^2=\text{Diag}(|h_1(i)|^2, \ldots, |h_L(i)|^2)$ is a real matrix. Consequently the generator matrix $M(i)$ of the array is itself a real matrix and it is possible to model the system by means of an array of real points $\Lambda$ of dimension K and of generator matrix $M(i)$:

$$y^R(i)=d^R(i)M(i)+n^R(i) \quad (27)$$

$$y^I(i)=d^I(i)M(i)+n^I(i) \quad (28)$$

where $y^R(i)$, $d^R(i)$, $n^R(i)$ (or respectively $y^I(i)$, $d^I(i)$, $n^I(i)$) are the vectors consisting of the real parts (or respectively the imaginary parts) of the components of $y(i)$, $b(i)$, $n(i)$. The observation vectors $y^R(i)$ and $y^I(i)$ belong to $R^K$. It can be shown that the noise vectors $n^R(i)$ and $n^I(i)$ both have as their covariance matrix $R(i)=C_D(i)C_D^T(i)N_0$.

$R(i)$ being a symmetrical matrix defined positive, it is possible, as above, to factorise it according to a Cholesky decomposition: $R=WW^T$ where W is a lower triangular real matrix of size $K \times K$. In order to decorrelate the noise components, the real observation vectors $y^R(i)$ and $y^I(i)$ are first of all subjected to a whitening operation:

$$\tilde{y}^R(i) y^R(i)^{WT-1} \quad (29)$$

$$\tilde{y}^I(i) y^I(i)^{WT-1} \quad (30)$$

Secondly, the closest neighbours of the vectors $\tilde{y}^R(i)$ and $\tilde{y}^I(i)$ belonging to the array of points $\Omega$ consisting of the vectors $\tilde{x}(i)=x(i)W^{T-1}$ where $x(i)$ belongs to $\Lambda$ are sought. It can easily be shown that, after whitening, the covariance matrix of the filtered noises $n^R(i)W^{T-1}$ is equal to $N_0 I_K$ where $I_K$ is the identity matrix of dimension K.

It can therefore be seen that, in the case of a downlink with real signatures, the decoding method leads to a search for two closest neighbours in an array of dimension K whilst, in the general case, which is complex, the decoding requires a search in an array of dimension 2K.

Figure 3:
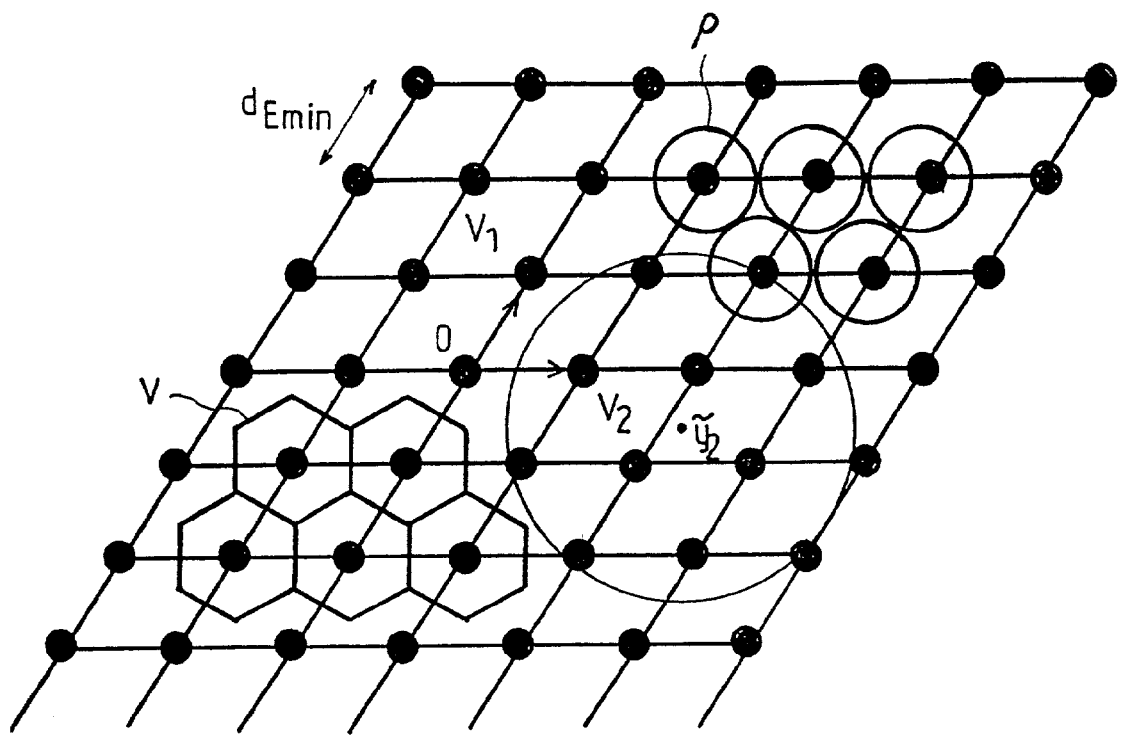
FIG. 3 depicts an array of points useful to the detection method according to the invention.

FIG. 3 illustrates schematically an array of points and the method of seeking the closest neighbour of a whitened observation vector $\tilde{y}_2$ in an array of dimension 2K or, in the case of real signatures, whitened observation vectors $\tilde{y}^R$, $\tilde{y}^I$ in an array of dimension K. These two cases will be dealt with with the same formalism and the size of the array will be denoted hereinafter κ.

In both cases the problem is to determine the point x on the array closest to the received whitened vector $\tilde{y}$, and this amounts to minimising the metric $$m(\tilde{y}/x) = \sum_{i=1}^{\kappa} |\tilde{y}_i - x_i|^2 = \|\tilde{y} - x\|^2 \quad (31)$$

where $\tilde{y}=x+\eta$, $\eta=(\eta_1, \ldots, \eta_\kappa)$ the noise vector and $x=(x_1, \ldots, x_\kappa)$ a point belonging to the array. The noise vector η has independent real components in accordance with a Gaussian distribution of zero mean and variance $\sigma^2$. Let R be the covariance matrix of the noise vector.

Alternatively, it will be noted that the vector y has no need to be whitened if a metric is used based on the covariance matrix:

$$m(y/x)=(y-x)R^{-1}(y-x)^T \quad (31')$$

For reasons of simplification, the term y will be given to the observation vector ($\tilde{y}$) whitened or not, and $\|\cdot\|$ to the metric acting in equation (31) or (31').

The points on the array $\{x=bG\}$ are obtained from vectors of data $b=(b_1, \ldots, b_\kappa)$ in which the components bi belong to the ring of integers Z. The lines of the matrix G are denoted $\{v_1, v_2, \ldots, v_\kappa\}$. By definition these vectors form a base of the array.

The set of symbols sent is limited to an alphabet of finite size $A_\kappa \subset Z^\kappa$ referred to as a constellation. This constellation is determined by the modulation constellations used by (or for) the κ users and the cardinal of the alphabet $A_\kappa$ is the product of the cardinals of the different modulation alphabets. It will be assumed that the complex points of each of these constellations have real values and complex values evenly distributed.

An exhaustive decoding would require a search for the closest neighbour in the whole of $A_\kappa$. The decoder advantageously restricts its calculation to the points which are situated within a zone of the constellation situated around the point received, preferably within a sphere of given radius $\sqrt{C}$ centred on the received point as depicted in FIG. 3. Only the points on the array situated at a quadratic distance less than C from the point received are therefore considered for the minimisation of the metric (31).

In practice, the decoder effects the following minimisation:

$$\min_{x \in \Lambda} \|y - x\| = \min_{w \in y - \Lambda} \|w\| \quad (32)$$

To do this, the decoder seeks the smallest vector w in the translated set y−Λ. The vectors y and w can be expressed as:

$$y = . G \text{ with } . = (\rho_1, \ldots, \rho_\kappa)$$

$$w = . G \text{ with } . = (\xi_1, \ldots \xi_\kappa) \quad (33)$$

It is important to note that ρ and ξ are real vectors. As w=y−x where x belongs to the array Λ, this gives the equation $\xi_i = \rho_i - b_i$ for $i=1, \ldots, \kappa$ with $$w = \sum_{i=1}^{\kappa} \xi_i v_i$$

The vector w is a point on the array whose coordinates $\xi_i$ are expressed in the translated reference frame centred on the received point y. The vector w belongs to a sphere of quadratic radius C centred at 0 if:

$$\|w\|^2 = Q(\xi) = \xi GG^T \xi^T \leq C \quad (34)$$

In the new system of coordinates defined by ξ, the sphere of quadratic radius C centred at y is therefore transformed into an ellipse centred at the origin. The Cholesky factorisation of the Gram matrix $\Gamma = GG^T$ gives $\Gamma = \ldots^T$, where Δ is a lower triangular matrix of elements $\delta_{ij}$.

It should be noted that, if the vector y has been whitened, there is no necessity to effect this factorisation since the generator matrix of $\Omega_2$ (or respectively of Ω) is equal to $AW_2$ (or respectively AW) and is therefore already lower and triangular.

However, where the prior whitening has not been carried out and therefore where the Cholesky decomposition is necessary:

$$Q(\xi) = \xi \cdot {.}^T \xi^T = \|{.}^T \xi^T\|^2 = \sum_{i=1}^{\kappa} \left( \delta_{ii} \xi_i + \sum_{j=i+1}^{\kappa} \delta_{ji} \xi_j \right)^2 \leq C \quad (35)$$

By putting $$q_{ii} = \delta_{ii}^2 \text{ for } i = 1, \ldots, \kappa$$

$$q_{ij} = \frac{\delta_{ij}}{\delta_{jj}} \text{ for } j = 1, \ldots, \kappa; i = j+1, \ldots, \kappa$$

there is obtained $$Q(\xi) = \sum_{i=1}^{\kappa} q_{ii} \left( \xi_i + \sum_{j=i+1}^{\kappa} q_{ji} \xi_j \right)^2 \quad (36)$$

Dealing first of all with the range of possible variations of $\xi_\kappa$, and then adding the components one by one, the following K inequalities are obtained, which all define the points within the ellipse:

$$q_{\kappa\kappa} \xi_\kappa^2 \leq C \quad (37)$$

$$q_{\kappa-1,\kappa-1}(\xi_{\kappa-1} + q_{\kappa,\kappa-1}\xi_\kappa)^2 + q_{\kappa\kappa}\xi_\kappa^2 \leq C$$

$$\forall l \in \{1; \kappa\}, \sum_{i=l}^{\kappa} q_{ii}\left(\xi_i + \sum_{j=i+1}^{\kappa} q_{ji}\xi_j\right)^2 \leq C$$

It can be shown that the inequalities (37) require the integer components b to satisfy:

$$\left\lceil -\sqrt{\frac{C}{q_{\kappa\kappa}}} + \rho_\kappa \right\rceil \leq b_\kappa \leq \left\lfloor \sqrt{\frac{C}{q_{\kappa\kappa}}} + \rho_\kappa \right\rfloor \quad (38)$$

$$\left\lceil -\sqrt{\frac{C - q_{\kappa\kappa}\xi_\kappa^2}{q_{\kappa-1,\kappa-1}}} + \rho_{\kappa-1} + q_{\kappa,\kappa-1}\xi_\kappa \right\rceil \leq$$

$$b_{\kappa-1} \leq \left\lfloor -\sqrt{\frac{C - q_{\kappa\kappa}\xi_\kappa^2}{q_{\kappa-1,\kappa-1}}} + \rho_{\kappa-1} + q_{\kappa,\kappa-1}\xi_\kappa \right\rfloor$$

$$\left\lceil -\sqrt{\frac{1}{q_{ii}}\left(C - \sum_{l=i+1}^{\kappa} q_{ll}\left(\xi_l + \sum_{j=i+1}^{\kappa} q_{jl}\xi_j\right)^2\right)} + \rho_i + \sum_{j=i+1}^{\kappa} q_{ji}\xi_j \right\rceil \leq b_i$$

$$b_i \leq \left\lfloor \sqrt{\frac{1}{q_{ii}}\left(C - \sum_{l=i+1}^{\kappa} q_{ll}\left(\xi_l + \sum_{j=l+1}^{\kappa} q_{jl}\xi_k\right)^2\right)} + \rho_i + \sum_{j=i+1}^{\kappa} q_{ji}\xi_j \right\rfloor$$

where $\lceil x \rceil$ is the smallest integer greater than the real x and $\lfloor x \rfloor$ is the largest integer less than the real x.

The decoder has κ internal counters, namely one counter per dimension, each counter counting between a lower and upper delimiter as indicated by equation (38), it being understood that, with each counter, there is associated a particular pair of delimiters. In practice, these delimiters can be updated recursively.

Advantageously, all the values of the vector b for which the corresponding point in the array x=bG is situated below the quadratic distance C of the point received are listed. The points on the array situated outside the sphere in question are not tested. It can therefore be seen that the decoding complexity does not depend on the size of the constellation of the array.

In addition, the search within the sphere can be considerably accelerated by updating the radius $\sqrt{C}$ with the last calculated Euclidian norm $\|w\|$. Finally, there is selected, as the best point x, the one associated with the smallest norm $\|w\|$.

The search radius $\sqrt{C}$ must be chosen in an appropriate manner. This is because the number of points in the array situated within the decoding sphere increases with C. This is why the choice of a large value of C is to the detriment of the decoding algorithm since the search sphere can be empty if C is too low.

So as to be sure that the decoder finds at least one point on the array, a radius of search greater than the radius of cover of the array is advantageously chosen. It can for example be taken to be equal to the upper Rogers band:

$$\sqrt{C^\kappa} = (\kappa \log \kappa + \kappa \log \log \kappa + 5\kappa) \times \frac{|\det(G)|}{V_\kappa} \quad (39)$$

where $V_\kappa$ is the volume of a sphere of unity radius in the real space $R^\kappa$.

It should be noted that the decoder operates on an array of points rather than on a modulation constellation. When the constellation employed on a dimension is a PAM constellation of order M, the integer coordinates of the point must be between 0 and M-1. Rather than testing once a point found, if this point does indeed belong to the constellation, the search limits of equation (38) can be adjusted so that they remain between 0 and M-1. There will thus be an assurance that all the points found are in the constellation and that the counters do not unnecessarily run through points which, in any event, do not belong to the constellation. This preselection makes it possible to considerably accelerate the decoding algorithm.

Figure 4:
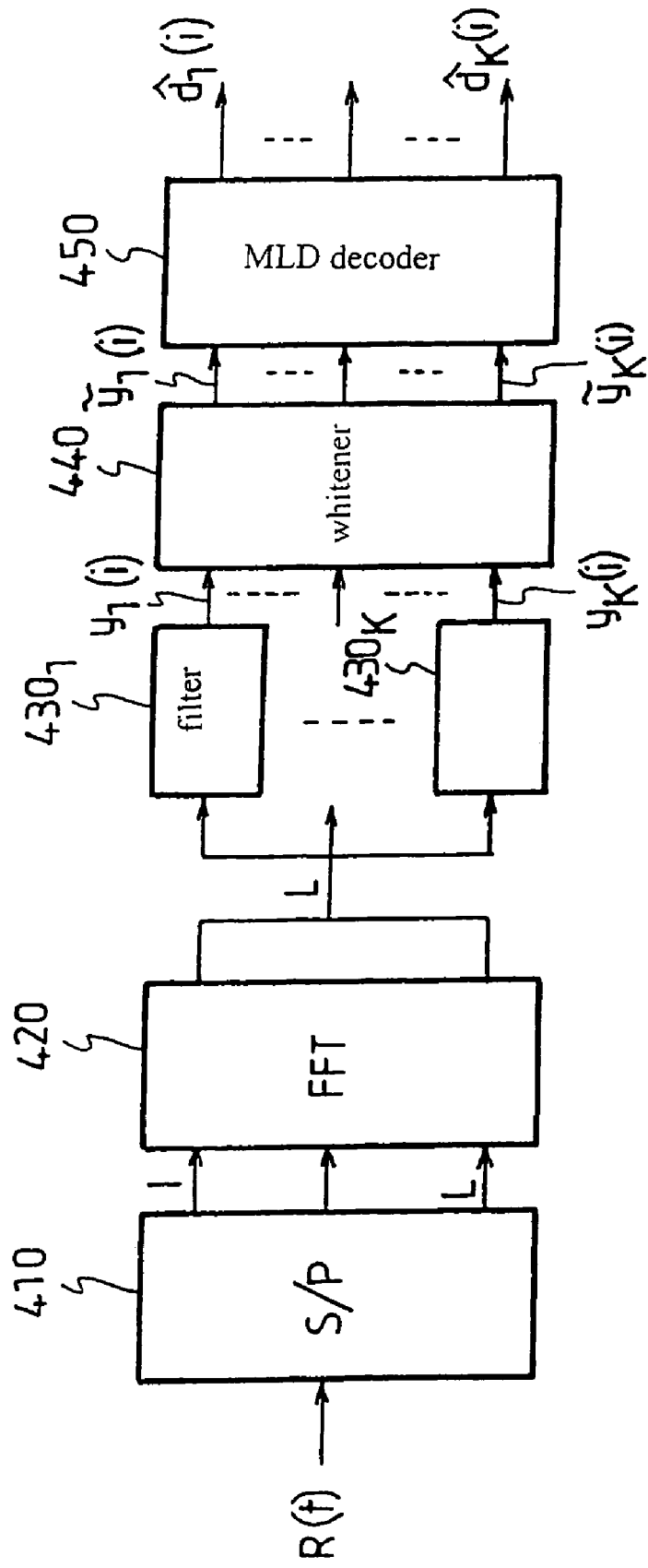
FIG. 4 depicts schematically the structure of a multiuser MC-CDMA receiver according to one embodiment of the invention.

FIG. 4 illustrates schematically the structure of a multiuser detection device according to one embodiment of the invention. The signal received is first of all sampled at the "chip" frequency and the samples are put in parallel by a serial to parallel converter. The vectors of L samples obtained are transformed at 420 by an FFT in the time delay. The L time samples are transmitted to a battery of K filters $430_1, \ldots, 430_K$ adapted to the signature and to the transmission channel of each user. These adapted filters make it possible to obtain the complex vector y(i) according to equation (9) or (10) according to the case of an uplink or downlink. The components of y(i) undergo a spectral whitening at 440 in order to decorrelate the noise samples. The whitened vector, ỹ(i), possibly after transformation of the type given by equation (21) (not shown), is the subject of a maximum likelihood decoding at 450 by seeking the point on the array $\Lambda_2$ closest to the end of the vector ỹ(i). The output of the decoding module 450 (possibly after transformation which is the reverse of the abovementioned one, not shown) is a vector d̂(i) whose components are the estimated symbols transmitted by the different users. In the context of a downlink using real signatures, the module 450 effects two searches for the closest neighbour in an array of points Λ of dimension K, as seen above.

Instead of supplying the estimated constellation symbols, the receiver can be adapted to supply flexible symbols. In this case, the search inside the decoding sphere is no longer limited to the closest neighbour but is extended to a plurality of the closest neighbours of the point relating to the received signal.

More precisely, an a posteriori probability $p^m$ is associated with each adjacent point $m=1, \ldots, m_{max}$, a probability that the vector $d^m(i)$ defined by this point has been sent, given the observation y(i). A flexible symbol of a user k is defined as the $M_k$-tuplet $(\pi_1, \ldots, \pi_{Mk})$ where $M_k$ is the cardinal of the modulation constellation of the user k and where $\pi_j$ is the probability that the symbol $s_j$ has been sent. This gives:

$$\pi_j = p(s_j/y) = \sum_{m=1}^{m_{max}} p(s_j/d^m) \cdot p^m \quad (40)$$

The a posteriori probabilities $p^m$ can for example be expressed by:

$$p^m = \frac{e^{-\lambda_m^2}}{\sum_{n=1}^{m_{max}} e^{-\lambda_n^2}}$$

where $\lambda_m$ is the distance separating the point received from the point corresponding to the vector $d^m(i)$.

Although certain embodiments of the invention have been depicted in the form of functional modules, it is clear that the device according to the invention can be implemented in the form of a processor programmed to execute the different functions illustrated or in the form of a plurality of dedicated processors able to implement one or more of these functions.

The invention claimed is:

1. A method of detecting a plurality of transmitted symbols ($d_k(i)$), each symbol belonging to one of a plurality of modulation constellations and spectrally spread before being modulated on a plurality (L) of carriers, said method comprising:
- a step of demodulating the plurality (L) of carriers to obtain a vector of signals including a received signal ($r(i)$); and
- a step of spectral despreading the received signal ($r(i)$) in order to supply a vector characteristic of said received signal, said step of spectral despreading including
- a step of searching, within an array of points ($\Lambda_2, \Omega_2$) corresponding to said plurality of modulation constellations, for at least a closest neighbour of said characteristic vector.

2. The method of claim 1, characterised in that said search step comprises searching a set of points on the array belonging to a predetermined area around said characteristic vector.

3. The method of claim 1, characterised in that said search step comprises searching a set of points on the array belonging to a predetermined area around an origin of said array.

4. The method of claim 2, characterised in that said predetermined area is a sphere.

5. The method of claim 1, characterised in that
the transmitted symbols having been spread spectrally by means of sequences with real values, said characteristic vector is decomposed into a first vector with real components and a second vector with real components, and
the search step comprises a step of determining a closest neighbour to said first vector and said second vector within an array ($\Lambda, \Omega$) of points with real coordinates of dimension K.

6. The method of claim 1, characterised in that, said characteristic vector being considered to be a vector with real components of size 2K, said search step consists of determining a closest neighbour within an array ($\Lambda_2, \Omega_2$) of points with real coordinates of dimension 2K.

7. The method of claim 6, characterised in that said search step comprises searching a plurality of real components of said characteristic vector, the said step of searching further comprising searching, for each of said components, an interval defined by a lower bound and an upper bound, said lower and upper bounds being chosen so that said interval does not include points relating to symbols which cannot belong to said one of a plurality of modulation constellations.

8. The method of claim 1, characterised in that the spectral despreading step includes a step of equalisation of the symbols obtained by said step of demodulation, thus supplying a vector ($y_2(i)$) of equalised symbols.

9. The method of claim 8, characterised in that said characteristic vector ($\tilde{y}_2(i)$) is obtained from the vector of equalised symbols ($y_2(i)$) by means of matrix processing configured to substantially decorrelate different noise components thereof.

10. The method of claim 1, characterised in that
said search step comprises searching a set of points adjacent to said characteristic vector, and
the transmitted symbols are estimated from symbols generating said adjacent points and distances separating said adjacent points from a received point.

11. A device for detecting a plurality of transmitted symbols ($d_k(i)$), comprising:
means for implementing the method claimed according to any one of the preceding claims.

12. A receiver for an MC-CDMA mobile telecommunication system comprising:
a detection device according to claim 11.

* * * * *